Patented May 1, 1928.

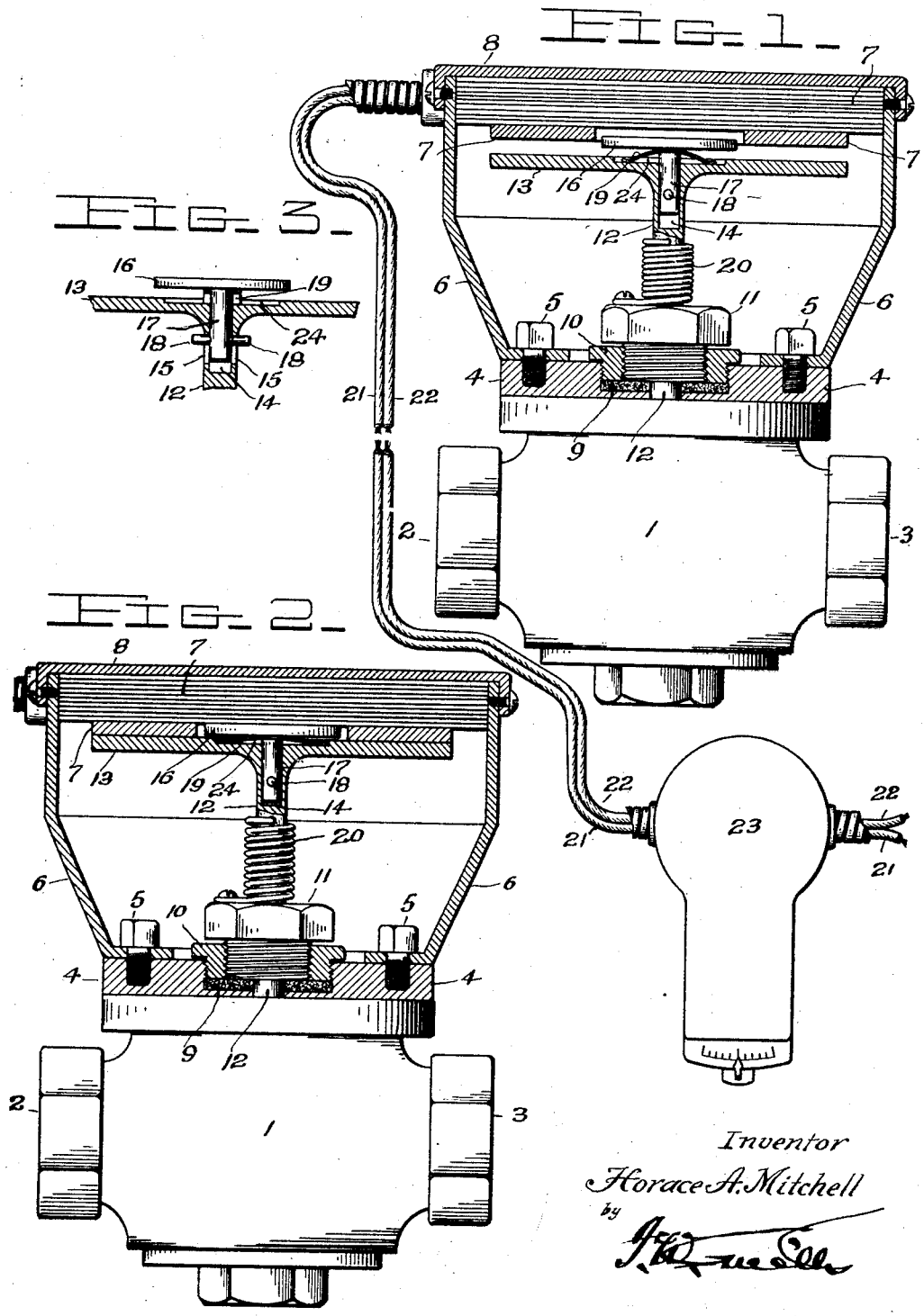

1,667,898

UNITED STATES PATENT OFFICE.

HORACE A. MITCHELL, OF FAIRFIELD, CONNECTICUT.

MAGNETIC RELAY VALVE.

Application filed July 16, 1927. Serial No. 206,373.

This invention relates to the regulation of steam or hot water heating, but more particularly has reference to the automatic operating of the stem of the valve which admits or shuts off the supply of the heating agent.

The invention specifically comprises an electro-magnetic relay valve, and, as the valve is carried by a stem, the invention is directly associated with the latter, and will be illustrated, described and claimed in connection with the valve stem.

The valve is of any approved style, but is preferably what is commonly known as a balance valve, and the outward movement of the stem may either open or close the valve according as the seats of the latter are arranged.

Heretofore electro-magnets have been used to attract an armature fixed to the stem whereby the energizing and deenergizing of the magnet may be automatically controlled for opening and closing the valve, and regulating the temperature caused by the heating agent, but the opening of the valve as well as the closing has been effected either by a hammer blow, or the opening of the valve has been suddenly effected so as to instantly admit a full force of the heating agent through the maximum outlet.

But this invention aims to open the valve partially at first and then fully, thus preventing the injurious results that always follow the sudden maximum admission of either steam or water.

The operating of the magnet and consequently the valve stem is automatically controlled by means of the conventional thermostat, in the present instance a mercoid heat control, but as this invention has nothing to do with any thermostat, the latter will not be illustrated or described in detail but will merely be shown in outline and referred to incidentally.

In the accompanying drawings which are to be read in connection with the description which follows, Figure 1 is an elevation partly in section, showing the position assumed by the elements when the magnet is deenergized, and also illustrating a thermostat with suitable connections for the electric current and for the magnet;

Figure 2 is a similar illustration showing the positions assumed by the elements when the magnet is energized, and Figure 3 is a detail broken section in a plane at right angles to that of the section at Figure 1, of the armatures and the connections between them.

Similar numerals of reference denote like parts in the several figures of the drawing.

1 is the casing which houses the usual balance valve and provided with the inlet 2 and outlet 3 for the heating agent, and mounted on the casing is a bonnet 4 to which is secured by bolts 5 a drum 6 made of non-magnetic material and within the top of this drum is secured an ordinary electromagnet 7, the drum being provided with the cover 8 in order to exclude dirt or other foreign matter.

An ordinary stuffing box is secured to the bonnet, comprising packing 9, a gland 10 threaded within the bonnet and driven against the packing, and a short bolt 11 threaded within the gland and likewise driven against the packing, and the valve stem 12 extends through this bolt, packing and bonnet in the usual manner, and is capable of lengthwise movement to open and close the valve.

This stuffing box merely prevents any leakage of steam.

Rigid with the upper end of the stem 12 is a large armature 13, and formed within the upper end of the stem and extending through the face of the armature is a socket 14, and within opposite walls of this socket are formed elongated slots 15.

16 is a relay armature, preferably smaller than the armature 13, having depending therefrom a pin 17 which is slidable within the socket 14 and is provided with diametrically opposite studs 18, which extend through the slots 15.

19 is a bow spring through which the pin 17 extends, and which functions to space apart the armatures 13 and 16, so as to normally support the armature 16 within the field of the magnet with the studs 18 abutted against the outer end walls of the slots 15, so that it will be clear that when this armature 16 is attracted by the magnet it will carry with it the armature 13.

20 is a coil spring around the stem 12 and having its extremities fixed to said stem and to the bolt 11, and this spring functions to normally thrust the stem so that it will open or close the valve as may be required, and also this function of the spring will withdraw the armature 13 so that it will normally be outside the field of the magnet, as is shown at Figure 1.

21, 22, are electric current wires which communicate with the magnet windings in the usual manner and these wires lead into any suitable thermostat 23 and then outwardly therefrom to the source of electric current.

When the electric circuit is closed by the adjustment of the thermostat to the required degree of temperature, thereby closing the circuit, the magnet will be energized, and the armature 16 immediately attracted, thereby partially opening the valve and bringing the armature 13 within the field of the magnet, whereupon this armature 13 will be attracted so as to complete the movement of the stem to fully open the valve, the position of parts being then as is shown at Figure 2.

The central portion of the armature 13 is slightly recessed as shown at 24 so that the spring 19 may be housed within this recess and not interfere with the contact of said armature with the magnet.

When the electric circuit is broken and the magnet deenergized, the spring 20 will force the stem to the position shown at Figure 1, the movement of the studs 18 through the slots 15 readily permitting this, and the spring 19 will thereupon recover so as to space the armatures apart and again bring the armature 16 within the magnetic field.

It will thus be readily understood that the successive operation of these armatures will effect a partial and complete opening or closing of the valve, according as the attraction of the magnet operates to open or close the valve, and this gives most beneficial effects, there is less wear on the parts, and the construction is positive in its operation.

What is claimed is:—

1. A magnetic relay valve, comprising a magnet, a source of electricity, means for energizing and de-energizing the magnet at predetermined temperatures, a valve stem, a main armature fixed to said stem and normally outside the field of the magnet, a relay armature normally within said field, slidable connections between said armatures, and means for resiliently supporting said relay armature in spaced relation to the main armature.

2. A magnetic relay valve, comprising a magnet, a source of electricity thermostatically controlled and connected with said magnet, whereby the latter may be energized and de-energized at predetermined temperatures, a valve stem, a main armature fixed to said stem, a relay armature having a pin which depends therefrom and is slidable within a socket in the stem, connections between said pin and socket whereby the attraction of said relay by the magnet will carry the main armature within the field of said magnet and yet permit independent movement of the stem, and a spring interposed between the armatures and normally forcing the relay within the field of the magnet.

3. A construction as in claim 1, with the addition that a spring operatively connected to the stem is opposed to the force of the magnet and operates to restore the stem to normal position.

4. A magnetic relay valve, comprising a magnet, a source of electricity, means for energizing and de-energizing said magnet at predetermined temperatures, a valve stem having an armature fixed thereto and a socket within its end, a relay armature having a pin depending therefrom and slidable within said socket, connections between said pin and socket whereby said relay when attracted by the magnet will carry the stem armature within the field of said magnet and will permit said stem armature to slide independent of said pin when drawn by the magnet, and a spring between said armatures and functioning to normally space them apart with the relay within the magnetic field and the stem armature outside said field.

In testimony whereof I affix my signature hereto.

HORACE A. MITCHELL.